Nov. 21, 1933.                M. LARSSON                1,936,168
METHOD OF PRODUCING DIAMMONIUM PHOSPHATE
Filed Aug. 18, 1930
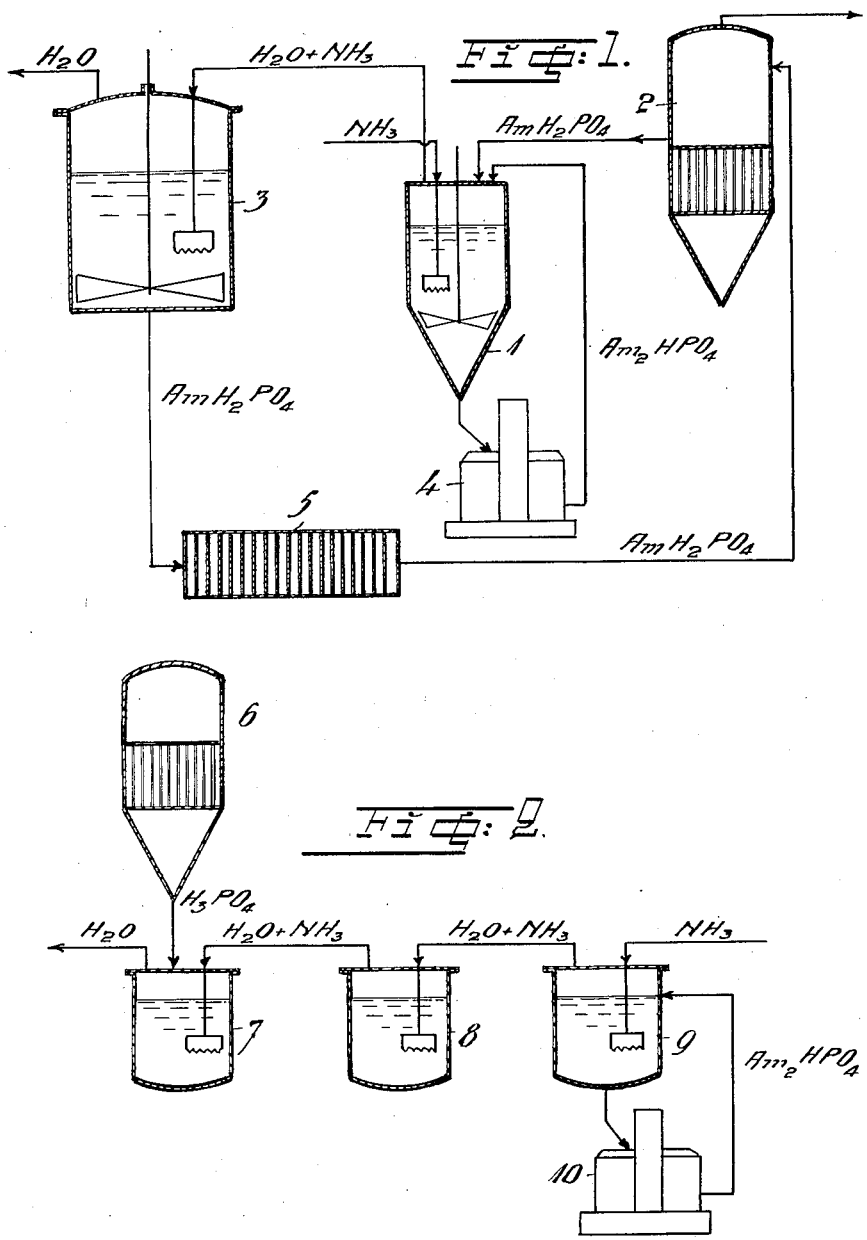
INVENTOR
Markus Larsson
BY Geo. J. Hyde
ATTORNEY Patented Nov. 21, 1933

1,936,168

UNITED STATES PATENT OFFICE

1,936,168

METHOD OF PRODUCING DIAMMONIUM PHOSPHATE

Markus Larsson, Berlin, Germany, assignor to Kunstdunger - Patent - Verwertungs-Aktiengesellschaft, Glarus, Switzerland Application August 18, 1930, Serial No. 475,914, and in Sweden August 23, 1929

3 Claims. (Cl. 23—107)

When diammonium phosphate is produced by absorption of ammonia into a solution of phosphoric acid or monoammonium phosphate considerable quantities of heat are evolved the utilization of which hitherto caused considerable difficulties. If ammonia is supplied to a concentrated solution of phosphoric acid or monoammonium phosphate the solution is rapidly heated to the boiling point and then the water is partly evaporated at the continued absorption so that the reaction heat is utilized for the concentration of the solution. As, however, a concentrated solution of diammonium phosphate has a comparatively high ammonia pressure, a great part of the ammonia supplied escapes together with the escaping steam which causes losses of ammonia and makes the technical application of the process impracticable.

This invention relates to a method of producing diammonium phosphate in which the reaction heat is fully utilized for the concentration of the solution without loss of ammonia. The essential feature of the invention consists, chiefly, in this that the ammonia is absorbed in a boiling solution of phosphoric acid or monoammonium phosphate until diammonium phosphate is formed and that the escaping mixture of steam and ammonia is supplied to a solution of phosphoric acid for the recovery of the ammonia.

In the accompanying drawing I have shown in Figs. 1 and 2 two embodiments of apparatus for carrying out my improved process.

Referring to Fig. 1, 1 is a saturation vessel provided with an agitator, to which a concentrated solution of monoammonium phosphate is supplied from an evaporator 2. The solution is, preferably, heated to the boiling point already when introduced in the vessel 1. To the vessel 1 ammonia is also supplied which at the first stage of the process is absorbed practically completely by the solution while steam escapes due to the heat evolved by the reaction. When about the half of the monoammonium phosphate has been converted into diammonium phosphate the absorption of the ammonia will be less complete and the escaping steam contains an increasing percentage of ammonia. The escaping ammoniacal steam is supplied to a vessel 3 containing a weak phosphoric acid solution which for instance has been produced by the leaching of phosphate rock with sulphuric acid or another mineral acid in presence of alkali sulphate. The quantity of phosphoric acid in the vessel 3 is suited in such manner that it corresponds to the quantity of monoammonium phosphate used in the vessel 1 and the phosphoric acid solution is, preferably, preheated to the boiling point before the ammoniacal steam is supplied thereto. The ammonia accompanying the steam is absorbed by the phosphoric acid in the vessel 3 to form monoammonium phosphate while pure steam escapes from the vessel 3. Said steam may be utilized for the preheating of the phosphoric acid solution which later is to be used in the process, or for other heating purposes. The reaction heat evolved when the ammonia is absorbed by the phosphoric acid in the vessel 3 causes a partial evaporation of the weak phosphoric acid solution and is thus also completely utilized.

The quantity of ammonia which escapes together with the steam from the vessel 1 during the time required for the conversion of the monoammonium phosphate in said vessel into diammonium phosphate is less than that required for the conversion of the phosphoric acid in the vessel 3 into monoammonium phosphate. It is, therefore, suitable to supply more ammonia to the vessel 1 than is required for the producing of diammonium phosphate. The excess of ammonia passes then through the solution without being absorbed and as the solution is hot (about 110 to 115° C.) said excess of ammonia carries away considerable quantities of steam whereby the temperature of the solution is lowered to 100° C. or still more and its concentration is increased. As diammonium phosphate is less soluble than monoammonium phosphate at high temperatures a great part of the diammonium phosphate formed crystallizes out in the solution. The crystal mass is separated from the solution either directly or after cooling in a centrifuge 4 whereupon the solid diammonium phosphate is dried at a moderate temperature while the mother liquor is returned to the vessel 1 together with the next charge of monoammonium phosphate solution.

When phosphoric acid obtained in the leaching of phosphate rock and generally containing impurities of iron, aluminium, calcium etc. is used in the process, said impurities are precipitated in the vessel 3 by the ammonia supplied. As said precipitation takes place at the boiling point of the solution a granulary precipitate is obtained which can easily be separated from the solution. The separation may, preferably, be performed in a filter press 5 whereupon the clear solution of monoammonium phosphate is supplied to the evaporator 2 for its concentration before it is supplied to the saturation vessel 1.

As is clear from the above description the whole quantity of heat developed by the reaction $2NH_3 + H_3PO_4 = (NH_4)_2HPO_4 + 41$ cal. is utilized for the concentration of the phosphoric acid solution supplied in the process. About one ton of water can in this manner be evaporated in neutralizing one ton of $P_2O_5$ from free phosphoric acid to diammonium phosphate.

In Fig. 2 I have shown another manner of carrying out the process. According to this embodiment I neutralize the phosphoric acid directly to diammonium phosphate while completely utilizing the reaction heat for the concentration of the solution. The comparatively weak phosphoric acid solution obtained in leaching phosphate rock is first concentrated to a suitable strength in an evaporator 6 and is then supplied to the first of a series of absorption vessels 7, 8, 9. The ammonia gas is supplied to the last absorption vessel 9, in which the solution is saturated to diammonium phosphate. From the vessel 9 ammoniacal steam escapes which is conveyed through the vessels 8 and 7, wherein the ammonia is completely absorbed and a further evaporation takes place. The steam escaping from the vessel 7 is used for the preheating of the weak phosphoric acid solution before the latter is supplied to the evaporator 6, or for other heating purposes.

After the contents of the vessel 9 have been neutralized substantially to diammonium phosphate, the contents are supplied to a centrifuge 10 in which the solid crystal mass is separated. Said vessel is then filled with phosphoric acid solution from the evaporator and placed first in the series of absorption vessels while ammonia now is introduced into the vessel 8, to which also the mother liquor from the contents of the vessel 9, preferably, is supplied. The process is thus continued until the contents of the vessel 8 have been saturated to diammonium phosphate, and so on.

What I claim is:—

1. The method of producing diammonium phosphate which comprises preheating a solution containing monoammonium phosphate substantially to its boiling point, introducing an excess of gaseous ammonia into said preheated solution until the latter is saturated substantially to the stage of $(NH_4)_2HPO_4$, supplying the escaping mixture of ammonia and steam to a second solution containing free phosphoric acid and being preheated beforehand substantially to its boiling point, and preheating phosphoric acid solution to be used in the continuous performance of the process by means of the steam escaping from the second solution.

2. The method of producing diammonium phosphate, which comprises preheating a solution containing monoammonium phosphate substantially to its boiling point, introducing gaseous ammonia into said solution, supplying the escaping mixture of ammonia and steam to a second solution containing free phosphoric acid and being preheated beforehand substantially to its boiling point, the supply of ammonia being continued until the monoammonium phosphate of the first-mentioned solution has been converted substantially into diammonium phosphate and the phosphoric acid of the last-mentioned solution has been converted substantially into monoammonium phosphate, removing solid diammonium phosphate from the solution of diammonium phosphate produced, and mixing the remaining mother liquor with the solution of monoammonium phosphate produced for use in the continuous performance of the process.

3. The method of producing diammonium phosphate, which comprises introducing an excess of gaseous ammonia into a boiling solution containing monoammonium phosphate until the latter is saturated substantially to the stage of $(NH_4)_2HPO_4$, and supplying the escaping ammoniacal steam to a second boiling solution containing free phosphoric acid, the said solutions being beforehand preheated substantially to their boiling point and the heat covered by the absorption of the ammonia being removed chiefly by the steam escaping from said solutions.

MARKUS LARSSON.